United States Patent [19]

Omura

[11] Patent Number: 4,494,790
[45] Date of Patent: Jan. 22, 1985

[54] RAIN GUTTER ARRANGEMENT FOR AUTOMOTIVE VEHICLE

[75] Inventor: Yutaka Omura, Fujisawa, Japan

[73] Assignee: Nissan Motor Co., Yokohama, Japan

[21] Appl. No.: 373,167

[22] Filed: Apr. 29, 1982

[30] Foreign Application Priority Data

May 8, 1981 [JP] Japan .................. 56-68964

[51] Int. Cl.³ .............................................. B60J 9/00
[52] U.S. Cl. .................................... 296/154; 49/476; 98/2.17; 296/213
[58] Field of Search ................. 296/154, 213; 98/2.17; 49/498, 476

[56] References Cited

U.S. PATENT DOCUMENTS

| | | | |
|---|---|---|---|
| 2,672,365 | 3/1954 | Stanton | 296/154 |
| 3,596,980 | 8/1971 | Cadiou | 296/154 |
| 3,927,493 | 12/1975 | Tsuneishi | 49/498 |
| 3,938,856 | 2/1976 | Janssen | 296/154 |
| 4,322,923 | 4/1982 | O'Neal | 49/498 |

FOREIGN PATENT DOCUMENTS 2209190 8/1973 Fed. Rep. of Germany .

*Primary Examiner*—Bruce H. Stoner, Jr.
*Assistant Examiner*—John A. Carroll
*Attorney, Agent, or Firm*—Lane, Aitken & Kananen

[57] ABSTRACT

The present invention features a sub or secondary weather strip which also functions as a rain gutter. The upper portion which extends along roof side rail is open to receive rain water while that portion which extends down along the front pillar is hollow and adapted to essentially fill the space defined between the front pillar and the sash of the door.

5 Claims, 7 Drawing Figures

RAIN GUTTER ARRANGEMENT FOR AUTOMOTIVE VEHICLE

BACKGROUND OF THE INVENTION

1. Field of the Invention

The present invention relates generally to a motor vehicle and more particularly to a rain gutter construction therefor.

2. Description of the Prior Art

In a previously proposed arrangement shown in FIGS. 2 and 3 of the drawings, a rain gutter has been provided along the roof and down the front pillar of the vehicle. In this arrangement, the numeral 1 denotes a roof panel, 2 a roof side rail, 3 a connector panel interconnecting the roof panel 1 and the roof side rail, 4 a sub-weather strip fixed to the respective connecting flanges of the roof panel and the connector panel, 5 a door sash, 6 a main door weather strip which is fixed to the sash 5 for engagement with the roof side rail 2 and providing a seal between the cabin interior and the external ambient atmosphere, and 8 a drip channel which is fixed to the front pillar 7.

Mounted on the front pillar 7 through an adhesive mass 11 and rubber seal member 12 is a windshield glass 10. Suitably mounted on the inner panel of the pillar 7 is a pillar finish 16 and fixed to the outer panel of the front pillar is a decorative mould 13. Attached to the bottom of the door sash 5 is a channel-like member 15 which receives a weather strip 17 adapted to sealingly receive a door window glass 14 therein.

The sub-weather strip 4 in this arrangement is arranged to continuously extend in the shadow of the door sash 5 along the roof rail and down the front pillar and further to resiliently engage an inboard surface of the door sash to provide, in combination with the weather strip 6, a double sealing effect and simultaneously define a gutter 9 for draining off rain water or the like.

However, this arrangement has suffered from the drawback that the drain channel or gutter defined down the front pillar is open to the atmosphere and defines an air-dam which both produces a disturbing noise when the vehicle is driven and which also adds to the wind resistance of same. To overcome this, it has been subsequently proposed to eliminate the rain gutter; however, this has led to the occupants being wetted by rain water or the like, which tends to collect at the top of the door, upon egress from the vehicle.

SUMMARY OF THE INVENTION

The present invention features a so called "sub-weather strip" which is hollow, which fills the space defined between the front pillar and door sash and which simultaneously acts as a drain channel for rain water collected in an upper portion of the strip which extends along the top of the door sash.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
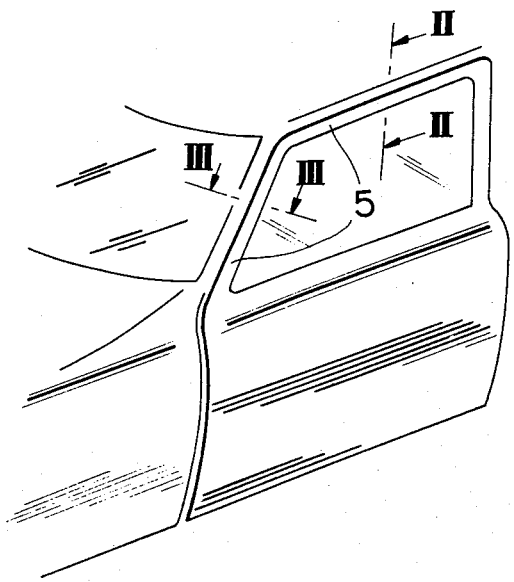
FIG. 1 is a perspective sketch of the front door of a vehicle.
Figure 2:
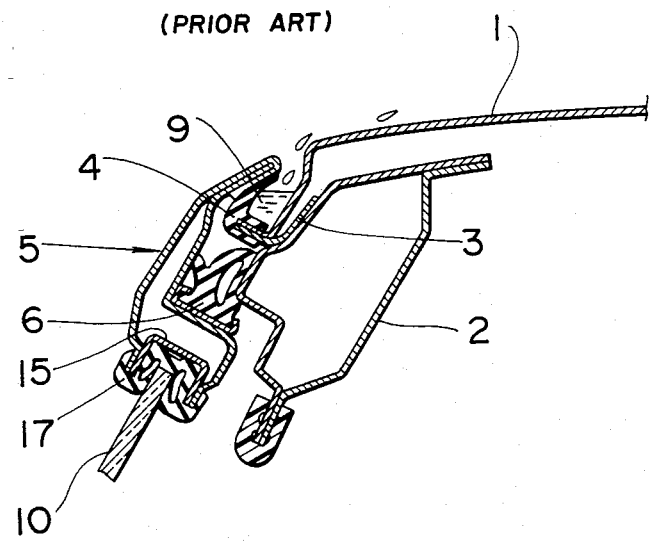
FIG. 2 is a section taken along section line II—II of FIG. 1.
Figure 3:
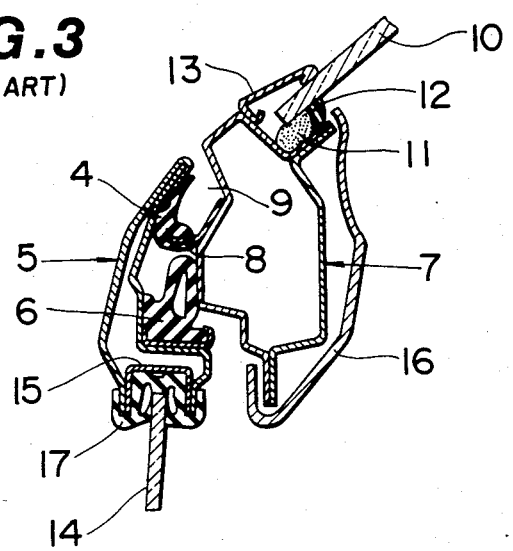
FIG. 3 is a section taken along section line III—III of FIG. 1.
Figure 4:
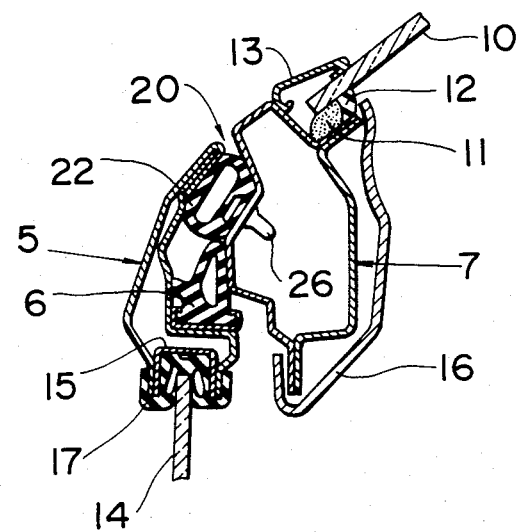
FIG. 4 is a sectional view similar to that of FIG. 3 but showing a first embodiment of the present invention.
Figure 5:
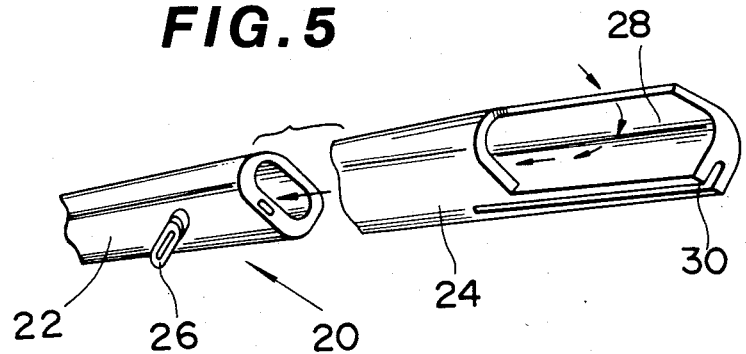
FIG. 5 is a perspective sketch showing the weather strip of FIG. 4.

Turning now to the drawings and in particular to FIGS. 4 and 5, a first embodiment of the present invention is shown. In this arrangement, the portion 22 of the elastomeric sub-weather strip 20 which extends down the front pillar 7 takes the form of a hollow tube-like arrangement which upon being contacted and compressed by the door sash 5, essentially fills the space defined between the sash and the front pillar 7 thus eliminating the air-dam of the prior art. The upper portion 24 of the weather strip which extends along the roof side rail has, as shown in FIG. 5, an opening 28 open to provide a collecting function similar to the arrangement shown in FIG. 3. In this first embodiment, the sub-weather strip 20 is formed as a single member and provided with grommet-like clips 26 which may be pressed into mating holes formed along the outer panel of the front pillar 7. The upper portion of the strip is formed with an opening 28 for collecting rain water and a slot 30 adapted to engage a member which resembles the drip channel 8 such as shown in FIG. 3.

With this arrangement, rain water or the like is collected in the upper portion 24 of the sub-weather strip 20 and thereafter drained off through the hollow tube like portion 22 leading down the front pillar 7.

Figure 6:
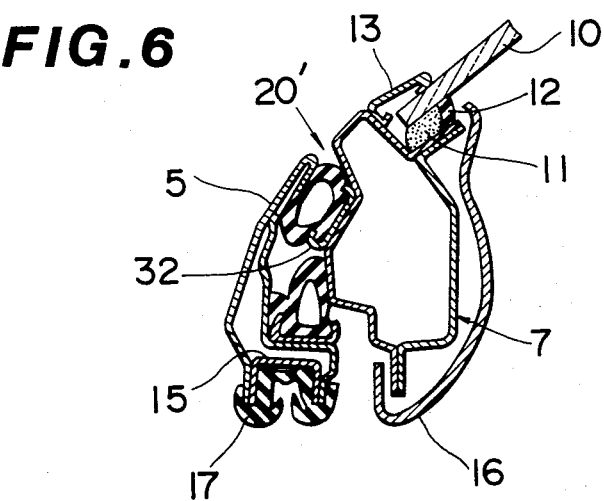
FIG. 6 is a sectional view similar to FIG. 4, but showing a second embodiment of the present invention.

FIG. 6 shows a second embodiment of the present invention. In this arrangement, the grommet like clips 26 of the first embodiment are dispensed with and replaced with a C-channel member 32 which is welded to the front pillar 7. As shown, the sub-weather strip 20' of this embodiment is adapted to be retainingly inserted into this channel member 32. This arrangement facilitates assembly, reduces weight and helps prevent rust formation in that the holes in the front pillar required in the first embodiment and the direct contact between the front pillar and the sub-weather strip, are eliminated.

Figure 7:
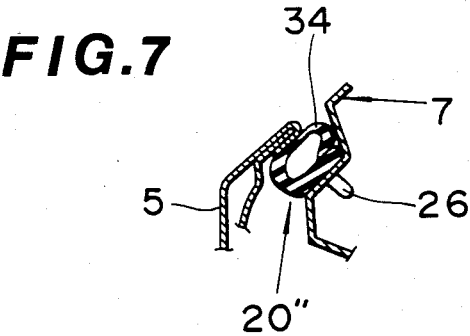
FIG. 7 is a sectional view of a third embodiment of the present invention.

FIG. 7 shows a third embodiment of the present invention. In this arrangement, the portion of the sub-weather strip which extends down the front pillar is arranged to be open and have a curled lip 34 which is moved into contact with the front pillar 7 upon closure of the door and consequent compression of the sub-weather strip 20" by the door sash 5. This embodiment features the advantage that should the drain channel become clogged with foreign matter, removal thereof is faciliated by simply rolling back the curled lip 34. Although this embodiment is shown secured to the front pillar by clips 26 similar to those used in the first embodiment, it may be secured via use of a C-channel member such as found in the second embodiment.

Although the preceeding disclosure has been directed to a sub-weather strip which is attached to the body of the vehicle per se, it is also possible to fix the strip to the door sash if deemed advantageous.

With the present invention it will be understood that as the air-dam formed by the prior art rain gutter arrangement is eliminated by the arrangement of the present invention, air tends to smoothly flow from the front pillar past the door sash lowering noise generation and air stagnation which tends to increase the air resistance of the vehicle.

What is claimed is:

1. In a vehicle:

a roof side rail fixed to said roof panel;

a front pillar;

a door having a sash, said sash juxtaposing said front pillar and said roof side rail when the door is closed;

a first weather strip fixed to one of said roof side rail and said front pillar or said door sash; and a second essentially hollow tube-like weather strip fixed to one of said roof side rail and said front pillar of said door sash, outboard of said first weather strip, said second weather strip having an opening formed in a first portion thereof which extends along said roof side rail for allowing rain water from said roof panel to enter into the hollow of said first portion, and a second portion which extends along said front pillar, said second portion being arranged to close the opening defined between said sash and said front pillar in a manner to prevent noise from being generated by air flowing past said front pillar, said second portion being further arranged to drain the water entering said first portion through the hollow thereof toward the bottom of the door.

2. A rain gutter arrangement as claimed in claim 1, wherein said second portion is formed with a curled lip which is pressed into contact with said front pillar when said door is closed.

3. A rain gutter arrangement as claimed in claim 1, wherein said second portion is provided with clips which engage said front pillar.

4. A rain gutter as claimed in claim 1, wherein said second portion is received in a C-channel member fixed to said front pillar.

5. A vehicle as claimed in claim 1, wherein said first portion is formed with a slot for receiving a drip channel secured to said roof side rail.

* * * * *